April 18, 1944. W. S. CLAUS 2,347,082
METHOD AND APPARATUS FOR TESTING DOUGH AND THE LIKE
Filed Sept. 30, 1942 4 Sheets-Sheet 1
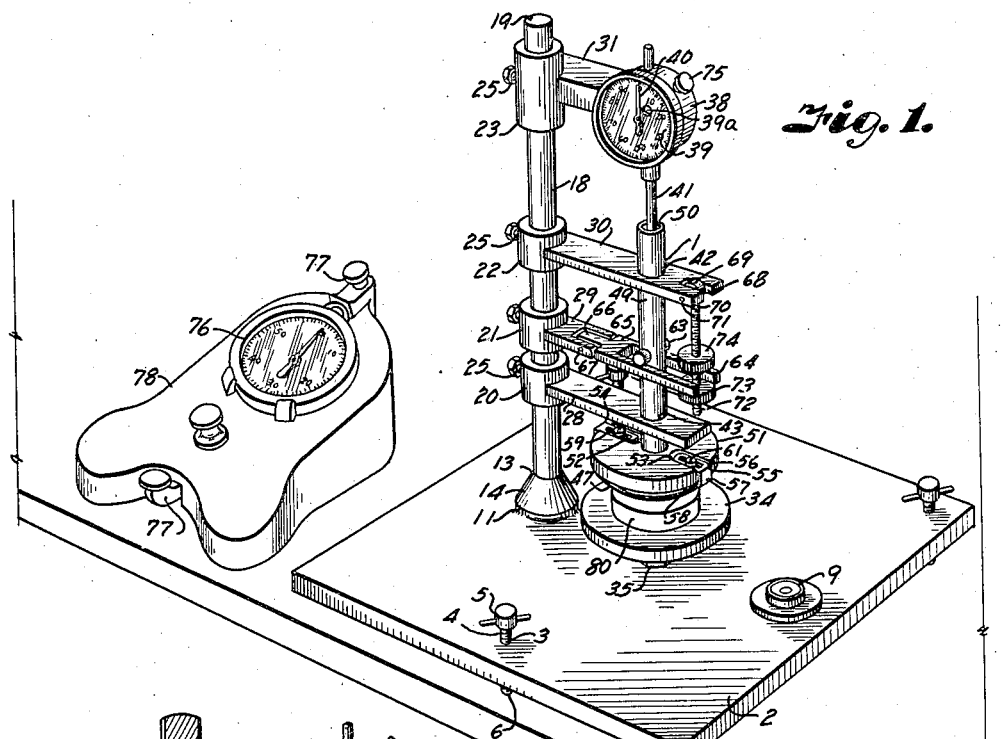
INVENTOR
Wilbur S. Claus.
BY Arthur C. Brown
ATTORNEY April 18, 1944. W. S. CLAUS 2,347,082
METHOD AND APPARATUS FOR TESTING DOUGH AND THE LIKE
Filed Sept. 30, 1942 4 Sheets-Sheet 2

INVENTOR
Wilbur S. Claus.
BY Arthur C. Brown.
ATTORNEY

April 18, 1944. W. S. CLAUS 2,347,082
METHOD AND APPARATUS FOR TESTING DOUGH AND THE LIKE
Filed Sept. 30, 1942 4 Sheets-Sheet 3
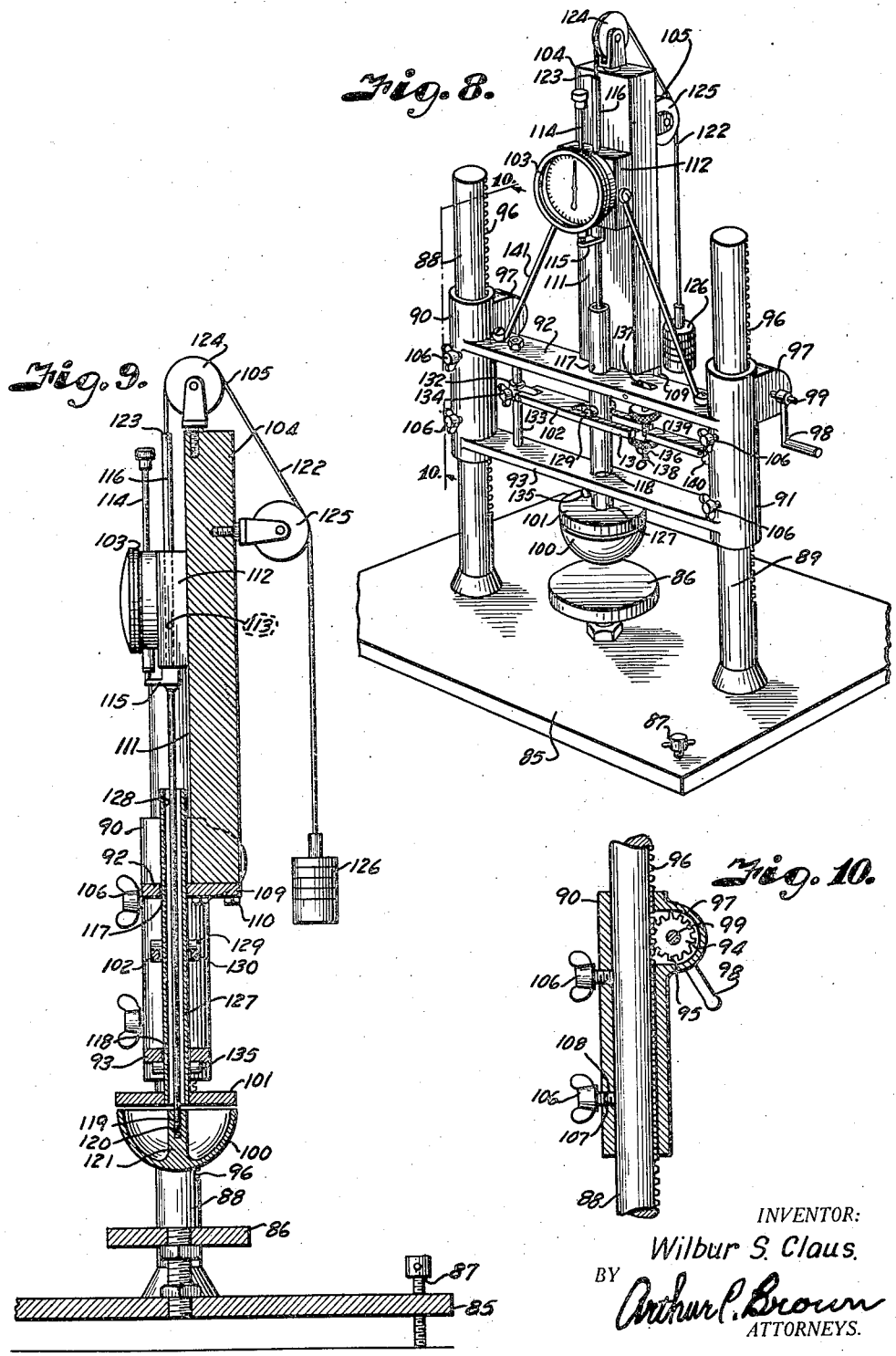
INVENTOR:
Wilbur S. Claus.
BY Arthur P. Brown
ATTORNEYS.

April 18, 1944.  W. S. CLAUS  2,347,082
METHOD AND APPARATUS FOR TESTING DOUGH AND THE LIKE
Filed Sept. 30, 1942  4 Sheets-Sheet 4

INVENTOR
Wilbur S. Claus
BY Arthur P. Brown
ATTORNEY

Patented Apr. 18, 1944

2,347,082

UNITED STATES PATENT OFFICE 2,347,082

METHOD AND APPARATUS FOR TESTING DOUGH AND THE LIKE

Wilbur S. Claus, Kansas City, Mo., assignor to Campbell-Taggart Research Corporation, Kansas City, Mo., a corporation of Missouri Application September 30, 1942, Serial No. 460,315

7 Claims. (Cl. 265—12)

This invention relates to a method and apparatus for testing dough, and more particularly to a ball type plastometer for determining the characteristics of dough and estimating the handling properties thereof, the principal object of the invention being to provide for conveniently, economically and efficiently testing the physical properties of a sponge or dough mix.

It has been found that in baking large quantities of bread, it is advisable to know the approximate baking qualities of the flour for each batch of dough in order that adjustment of ingredients and baking conditions may be made to maintain the proper standard of the products. Various chemical and mechanical tests have been made heretofore on flours and while such tests are helpful in some measure, they cannot always be depended upon to indicate the true handling conditions for flour. The present apparatus is used especially to supplement such tests by accurately indicating some of the physical properties of the dough mix.

It has been determined that elasticity modulus and plasticity are physical properties of dough and have significance in determining handling properties. A combination of these properties indicates the optimum absorption and mixing time.

Plasticity of the dough is a function of its fluidity, which is the same thing as viscosity for non-Newtonian fluids. The elasticity modulus is a ratio between unit stress divided by unit strain. Relaxation time is the ratio of the plasticity value divided by the elasticity modulus value.

All of these properties have been determined in the past by various tests but when the tests are made at different times or on different apparatus, it is difficult to correlate the various readings. The result therefore was that the operator had available merely a group of readings that could not be correlated to definitely indicate the handling conditions of the flour.

Further objects of the present invention are, therefore, to provide for accurately determining a number of physical properties, some of which are plasticity, elasticity modulus, percent softness and relaxation time of a specimen in a single cycle of readings; to avoid disturbing the specimen during testing; to provide for testing freshly mixed dough or other doughs during any degree of fermentation or working; and to provide uniform and accurate readings of the different physical properties of the specimen.

Other objects of the invention are to provide for engaging a dough specimen under test with a spherical surface; to provide for adjusting the spherical surface to contact the specimen; to provide for weighting the spherical surface for compressing the test specimen; to provide for compressing the test specimen for a predetermined period of time; to provide for measuring the amount of compression; to provide for removing the weight to permit recovery of the dough; to provide for measuring the recovery of the test specimen in a predetermined period; to provide an apparatus capable of being exactly timed as to each operation; to provide for eliminating friction in the testing device; to provide a testing apparatus that is easily cleaned; and to provide improved elements and arrangements thereof in a testing apparatus of the character described.

In accomplishing these and other objects of the present invention, I have provided improved arrangements and details of structure, the preferred forms of the apparatus of which are illustrated in the accompanying drawings, wherein:

Fig. 1 is a perspective view of a testing apparatus embodying the present invention, associated with a timing device, the apparatus being shown in condition for starting a test on a specimen.

Fig. 2 is a vertical transverse section through my improved testing apparatus, the apparatus being shown in specimen compressing position.

Fig. 3 is a detail perspective view of the weight supporting arm.

Fig. 8 is a perspective view of a modified form of testing apparatus in which the testing member is balanced.

Fig. 9 is a vertical transverse section through my modified form of testing apparatus.

Fig. 10 is a vertical sectional view on the line 10—10, Fig. 8 showing the vertical adjustment of the apparatus.

Figure 11:
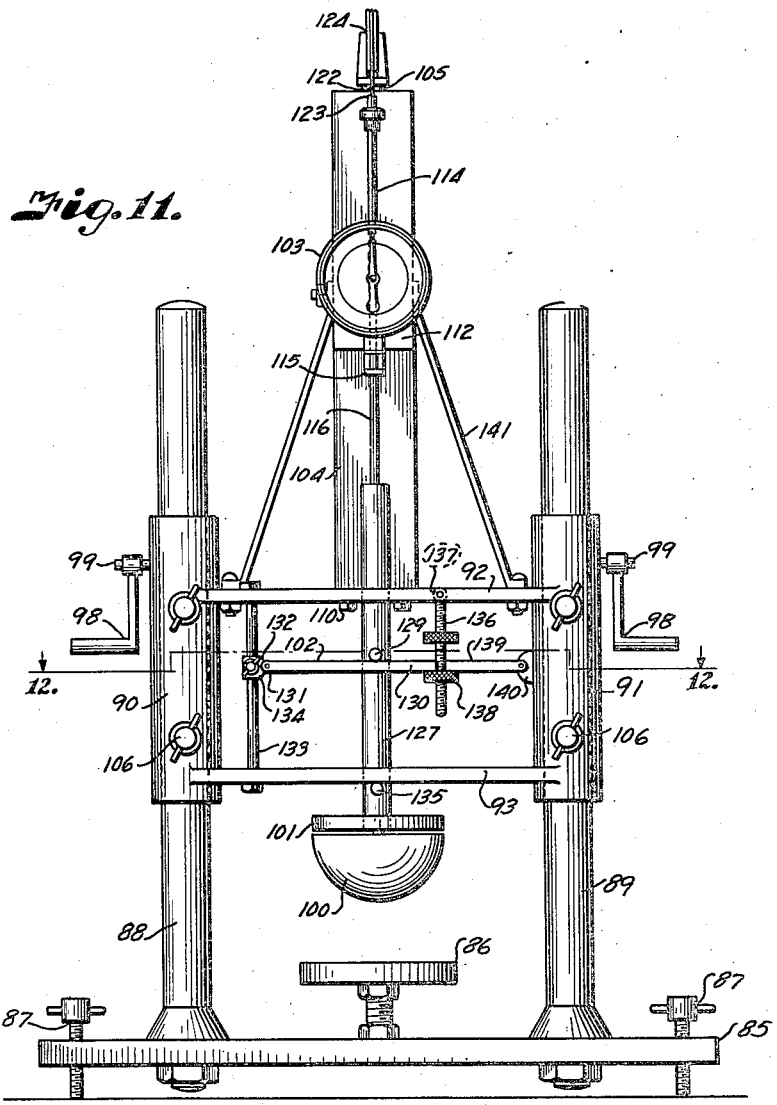
Fig. 11 is a front elevational view of the modified form of testing apparatus.
Figure 12:
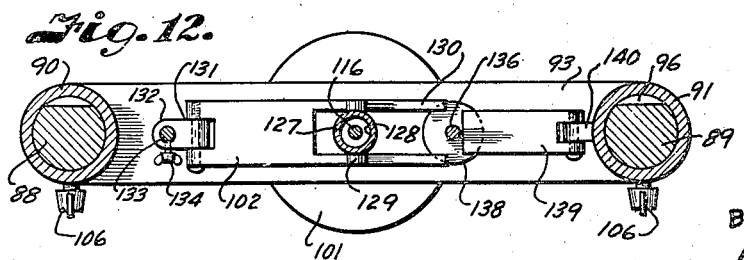
Fig. 12 is a horizontal sectional view on the line

12—12, Fig. 11 particularly illustrating the lifting and locking arms.

Referring more in detail to the drawings:

1 generally designates a testing apparatus of the modified ball plastometer type and embodying the present invention for testing specimens of dough or sponge mixes. This testing apparatus preferably includes a base 2 having spaced threaded openings 3 for receiving threaded shanks 4 of levelling screws 5. The shanks 4 preferably have rounded ends 6 adapted to engage a surface 7 of a table or other suitable support 8 on which the apparatus may be placed. A level 9 is preferably provided on the plate 2 for indicating when the apparatus is in level condition.

Formed adjacent one side of the base is an opening 10 extending through bosses 11 and 12 respectively above and below the plate 2. Mounted on the base plate and in the opening 10 thereof is a column 13 having an enlarged portion 14, the bottom face 15 of which is adapted to engage the boss 11 on the base plate 2. Projecting downwardly from the portion 14 and through the opening 10 is a threaded shank 16 for receiving a nut 17 to engage the boss 12 and secure the column to the base plate. Extending upwardly from the enlarged portion 14 is a post 18 having a groove 19 preferably of V-shape extending substantially the full length thereof for receiving and for aiding in maintaining locking members and for aiding in maintaining the several elements in strict alignment.

Sleeved over the post 18 are collars 20, 21, 22 and 23, each provided with a threaded opening 24 for receiving the threaded shank 25 of a set-screw having a reduced preferably pointed end 26 adapted to engage the groove 19 of the post and secure the respective collars in spaced relation thereon. Said collars respectively carry, preferably at opposite diametrical sides of the collar relative to the set-screw, a lower guide 28, a weight supporting arm bracket 29, an upper guide 30, and a dial indicator arm 31, each of said members projecting outwardly toward the center of the base plate 2 to support the operating elements of the testing apparatus.

Preferably centrally located in the base plate 2 is a threaded opening 32 into which is preferably removably threaded a shank 33 of a plate adjusting stud carrying a specimen mounting plate 34 on the upper end thereof. It is preferable that the specimen mounting plate be of larger area than the specimen substantially as indicated. Lock nuts 35 and 36 are threaded on the stud and adapted to respectively engage the base plate and the specimen plate 34 to lock the same in relatively vertically adjusted position.

Figure 4:
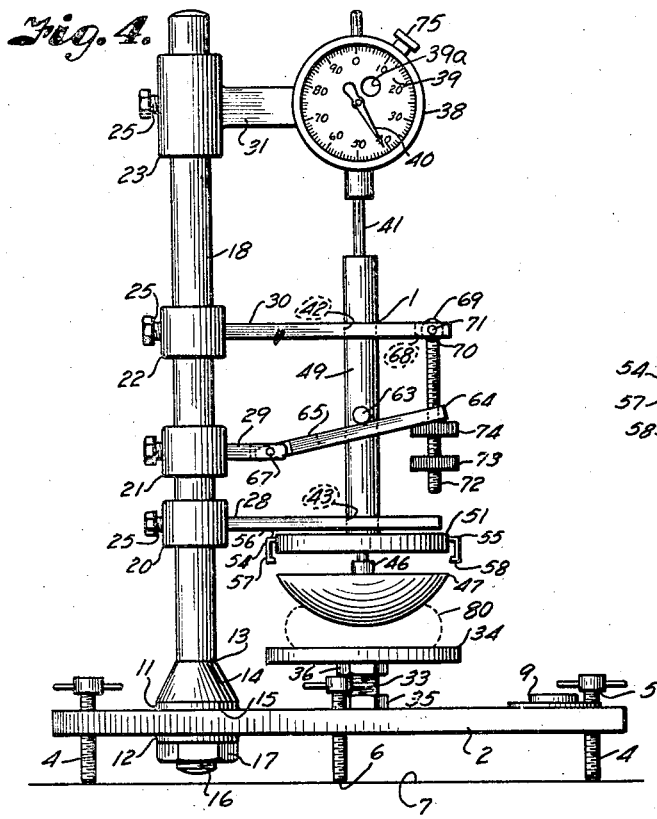
Fig. 4 is a front elevational view illustrating the weight supported by the arm during recovery of the test specimen.
Figure 6:
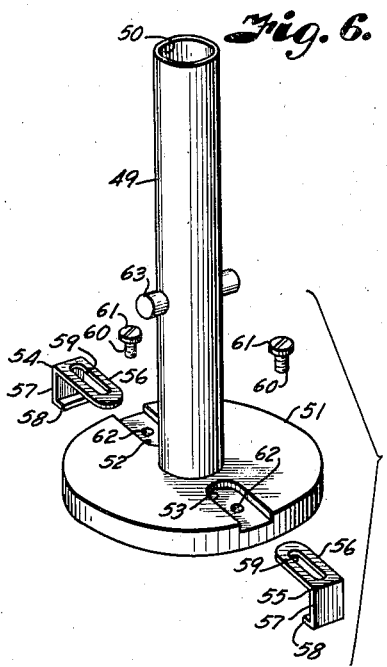
Fig. 6 is a detail perspective view of the weight member, the parts thereof being shown in spaced relation.
Figure 5:
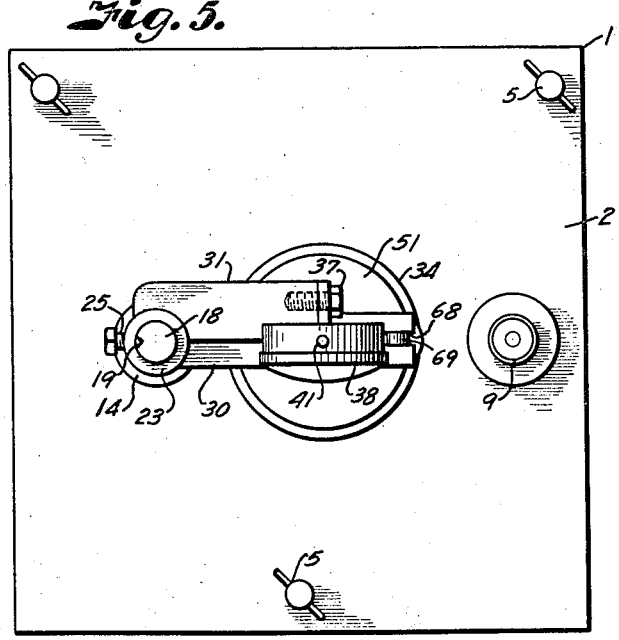
Fig. 5 is a plan view of the testing apparatus.
Figure 7:
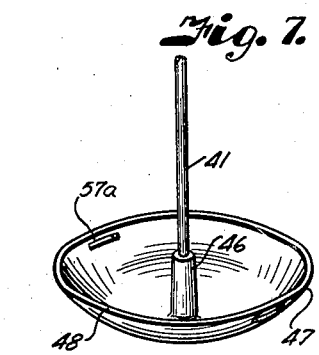
Fig. 7 is a perspective view of the test specimen engaging member.

Mounted on the end of the arm 31, preferably by means of a screw 37, Fig. 5, is a dial indicator 38, having a dial 39 preferably graduated to one-thousandth of an inch.

A pointer 40 indicates the movement of the dial actuating rod 41 depending from the dial indicator in alignment with the axis of the specimen plate 34, each increment of drop of the rod, such as one-hundredth of an inch, preferably causing a complete revolution of the pointer. These revolutions are preferably recorded on a "tell-tale" dial 39a. The rod 41 extends downwardly through openings 42 and 43 in the upper and lower guides 30 and 28, said rod being provided with a threaded portion 44 on the lower end thereof for engaging a threaded recess 45 in a boss 46 of a specimen engaging member 47, having an engaging surface of spherical shape and which is sometimes preferably of substantially larger contact area than the specimen to be tested.

The specimen engaging member is preferably hollowed to form a thin walled structure 48 of such a character that a relatively small weight is exerted by said member on the test specimen during recovery. Sleeved over the rod 41 and projecting through the guide openings 42 and 43 for free movement therein is a tube 49 having an inner bore 50 substantially larger in diameter than the rod 41 to eliminate frictional contact therebetween. The tube 49 carries on its lower end a weight 51 in the form of a disk of substantially the same outer diameter as the specimen engaging member and adapted to engage said member to apply weight to the test specimen and effect compression thereof. The upper surface of the weight 51 is recessed, as at 52 and 53, for mounting lifting hooks 54 and 55. The lifting hooks preferably consist of slotted horizontally arranged members 56 adapted to engage in the recesses 52 and 53, and terminating at their outer ends in downwardly extending legs 57 carrying inwardly turned hooks 58 on the lower ends thereof for engaging in slots 57a in the spherical surface of the specimen engaging member for the purpose of providing a positive connection between the ball and tube. Extending through the slots 59 in the members 56 are shanks 60 of screws 61 which are threaded into threaded openings 62 in the weight member 51 and form a loose fitting guide for the lifting hooks.

Extending laterally of the tube 49, and arranged intermediately of the upper and lower guide members, are lugs 63 adapted to be engaged by fingers 64 of a bifurcated weight supporting arm 65, the fingers 64 being spaced sufficiently to straddle the tube 49 without engagement therewith. The arm 65 is provided with a projection 66 hingedly mounted by a hinge pin 67 on the weight supporting bracket 29, which is preferably located between the upper and lower guide members.

The upper guide member is preferably longer than the lower guide and is slotted adjacent its outer end, as at 68, to receive a head 69 of a weight adjusting screw 70 which is preferably pivotally mounted on a hinge pin 71 extending through the slotted end of the upper guide.

The threaded shank 72 of the weight adjusting screw carries spaced thumb nuts 73 and 74 for engaging the outer ends of the fingers 64 and supporting the same in selected weight supporting position, by holding said arm 64 in engagement with the lugs 63, said position being adjustable by rotating said thumb nuts to the selected positions for the adjusted height of the weight 51.

The dial indicator 38 preferably includes a setting member 75 for adjusting the dial 39 to zero when the spherical surface is supported in contact with the test plate prior to application of a test specimen to the test plate. The nut 73 is used to adjust dial indicator hand 40 to zero, when the spherical surface 48 is in contact with the dough specimen 80. The dough specimen may be of any given height, for example, $\frac{5}{16}$ of an inch, which will be initially indicated on the "tell tale" dial 39a. It will be recognized that a definite size and shape of the specimen is desirable and in many cases essential in order to obtain the desired data for the purpose of determining the physical properties of a given batch of dough. Associated with the testing apparatus is a stop watch 76 having controls 77 all preferably carried on a base 78 which may be located on the table 8 adjacent the base plate 2 in convenient position to be observed by the operator.

In adjusting a testing apparatus having the parts constructed and assembled as described, a specimen of suitable size and preferably of disk shape, is decided upon, and the collar 21 is adjusted to a suitable position on the post to the end that when the member 65 is horizontally arranged, the fingers 64 engage the lug 63 to support the spherical surface 47 above the specimen plate 34 a distance equal to the thickness of the specimen decided upon, the fingers 64 being held in position by engagement thereof with the thumb nut 73. The thumb nut 74 is preferably threaded upwardly on the shank 72 above the nut 73 in such a manner that when the fingers 64 engage the nut 74, the weight 51 is raised sufficiently above the spherical member 47 that there is no possibility of any contact between the member 47 and the weight 51 during the recovery period of any test specimen. The collars 20 and 22 may be adjusted to such a position on the post 18 that they properly guide the tube 49 without interference with the normal operations thereof.

In preparation for testing the dough, the thumb screws 5 are adjusted to level the testing apparatus as indicated by the level 9 on the base plate 2. The stop watch is placed at zero and the fingers 64 are arranged in engagement with the thumb nut 74 to carry the weight 51. The specimen engaging member, which is supported by engagement of the lifting hooks in the slots thereof, is arranged at a suitable height above the specimen location to permit application of a suitably shaped specimen 80 below the specimen engaging member.

The fingers are then disengaged from the thumb nut 74 by pivoting the screw 70 outwardly. Said fingers are placed on the thumb nut 73 which are adjusted to permit the spherical surface 47 to contact the test specimen. The dial indicator hand 40 is then set at zero by adjusting the thumb nut 73 and the stop watch set at zero by the proper control 77.

Under normal testing conditions the time required for such adjustment is very small inasmuch as there is little variation in the thickness of the specimen to be tested.

After all adjustments have been made the weight adjusting screw is pivoted on the pin 71 to release the weight 51 and the spherical surface 47 to start compression of the dough specimen. The stop watch 76 is started simultaneously with release of the load on the dough specimen. The amount of the compression is read at definite time intervals and recorded to indicate any variation in the time compression ratio. After a specified time of compression, the lifting hooks are released from engagement with the spherical surface by pulling them outwardly from the recesses 52 and 53 and the load is removed from the specimen engaging member by raising the arm 65 until the fingers 64 engage the lugs 63 and lift the weight 51 sufficiently for the fingers to be re-engaged with the thumb nut 74.

The test specimen is then allowed to recover and the amount of recovery is read at definite time intervals until the optimum or other desired recovery is completed. From these measurements of compression and recovery, correlated with the time intervals involved, the physical properties may be obtained by suitable calculations.

In Figs. 8 to 11, inclusive, I have shown a modified form of plastometer in which the testing mechanism is vertically adjustable relative to the specimen plate to provide for accommodating various sizes and thicknesses of specimens for testing. The accuracy of this type of plastometer is enhanced by balancing the weight of the specimen enaging member in such a manner that only a selected weight is applied to the specimen engaging member regardless of the position of the testing apparatus. This modified form of plastometer preferably includes a base 85 having a specimen mounting plate 86 centrally and removably located thereon, said base being adapted to be levelled by screws 87 in the same manner as the base of the preferred form of apparatus.

Mounted on and extending upwardly from the base on each side and spaced from the specimen mounting plate are columns 88 and 89. Sleeved over the columns are guide collars 90 and 91 rigidly connected by upper and lower cross members 92 and 93 so that the collars move up and down the columns together in response to rotation of pinions 94 having teeth 95 engaging rack teeth 96 on the rear of said column. The pinions are preferably enclosed in a housing 97 extending rearwardly of the collars and such pinions are rotated manually by cranks or the like 98 secured to the pinion shaft 99 to effect movement of the collars and cross-members.

All of the testing apparatus including the specimen engaging members 100, the weights 101, weight supporting arm 102, dial indicating device 103, dial support 104 and a specimen engaging member balancing mechanism 105 are carried by the cross-members and are raised and lowered to selected positions relative to the specimen mounting plate by rotation of the pinions 94 by the cranks 98. The collars are held in selected position by wing screws 106 having shanks 107 inserted into openings 108 in the collars to engage the respective columns.

The upper cross-member 92 is provided with a rearward extension 109 on which the dial support 104 is secured as by cap screws 110. The support 104 extends upwardly centrally and spaced slightly to the rear of a median line between the columns 88 and 89 and carries on the front face 111 thereof an auxiliary plunger block 112 having a bore 113 in alignment with the axis of the specimen mounting plate 86. Mounted on the block 112 is a dial indicator 103 having an actuating rod 114 extending therethrough and having the bottom end of said rod connected with a forward extension 115 of a rod 116 reciprocably mounted in the bore 113 of the block 112. The rod 116 extends downwardly through openings 117 and 118 in the upper and lower cross-members 92 and 93, said rod being provided with a threaded portion 119 for engaging the threads of the threaded recess 120 in a boss 121 in the hollow spherically shaped specimen engaging member 100.

The specimen engaging member is preferably constructed similarly to that shown in the preferred form of plastometer in that it is hollow to form a thin wall structure of relatively small weight. It is desirable in this instance to accurately balance the weight of the specimen engaging member so that any predetermined amount of weight may be applied thereto for testing the dough specimen. The weight of a specimen engaging member 100 is balanced by connecting the line 122 to the top of the rod 116 as at 123 and passing said line over pulleys 124 and 125 suitably mounted on the support 104 and placing suitable weight 126 on the end of said line 122 until a proper balance has been attained. The weight 101 normally applied to the specimen engaging member is carried on the end of a tubular member 127 sleeved over the rod 116 and which projects through the openings 117 and 118 to allow free movement of the tube through the cross-members 92 and 93.

As in the preferred form of invention, the tube is provided with a large inner bore 128 to eliminate frictional contact between said tube and rod 116. Extending laterally of the tube 127 and preferably arranged intermediately of the upper and lower cross-members, are lugs 129 adapted to be engaged by fingers 130 of a bifurcated weight supporting arm 102. The fingers 130 are spaced sufficiently to saddle the tube 128 without engagement therewith. The arm 102 is preferably hingedly mounted, as at 131, on a lug 132 mounted for vertical adjustment on a post 133 extending between the upper and lower cross-members, such lug being held in selected position by a wing screw 134. The tube 127 is also provided with laterally extending lugs 135 adapted to engage the bottom of the lower cross-member 93 to limit upward movement of the tube and weight member 101.

The weight and the weight supporting arm are preferably held in their upper position by an adjustment screw 136 hingedly mounted, as at 137, to the upper cross-member for allowing swinging movement longitudinally of the weight supporting arm to move adjusting nut 138 into and out of supporting position relative to the weight supporting arm. The screw 136 may be held to prevent its being swung to release the weight supporting arm by a lock lever 139 hinged to an ear 140 on the collar 91 and adapted to engage the screw 136 to hold it in such a position that the nut 138 thereon may engage the fingers of the weight supporting arm 102. The arm 102 may be released by swinging the screw to the left in Fig. 11 to release the lock bar 139 and allow same to be dropped out of screw engaging position, thus permitting the screw to be swung to the right to release the weight supporting arm and the weight 101 onto the specimen engaging member.

Suitable bracing 141 may extend from the upper cross member adjacent the collar to the block 112 to increase the rigidity and stability of the testing apparatus.

Practice of my method with the modified form of plastometer is substantially the same as that of the preferred form of invention, except that the weight of the specimen engaging member is balanced and the entire testing apparatus may be raised or lowered to accommodate varying thicknesses of specimens.

The adjustment of the apparatus is effected by rotation of the crank 98 and the apparatus may be secured in the desired position by tightening the wing screws 106 so they will engage the respective columns 88 and 89. The lock for the weight supporting arm must be maintained in place during the adjustment of the apparatus to prevent accidental displacement of the weight supporting arm and engagement of the specimen engaging member with the specimen being tested. However, after release of the lock and the weight supporting arm, the actual test of the test specimen is the same as with the preferred form.

What I claim and desire to secure by Letters Patent is:

1. In a method of testing the physical properties of a fermenting dough mix, the steps of forming a dough specimen of predetermined size and shape, supporting the dough specimen in unconfined condition on a flat surface, applying a constant compression load to the dough specimen so supported by a spherical surface of larger area than said specimen to compress the specimen and provide for lateral flow thereof, and measuring the reaction of the dough specimen responsive to compression, fluidity, elasticity and change in retained gas pressure.

2. In a method of testing the physical properties of a fermenting dough mix, the steps of forming a dough specimen of predetermined size and shape, supporting the dough specimen in unconfined condition, supporting a specimen engaging member having a spherical engaging surface of larger area than said specimen above the specimen, applying a constant load to said specimen engaging member, releasing said engaging member to compress the specimen and provide for lateral flow thereof, measuring the compression of the specimen at predetermined time intervals, removing the load from the specimen engaging member, and measuring the recovery of said dough specimen at predetermined time intervals, said compression and recovery of said dough specimen being responsive to fluidity, elasticity and change in retained gas pressure.

3. In a testing apparatus of the character described, a support, a post on the support, a specimen plate on the support, an indicating device, means on the post for supporting the indicating device in vertical alignment with the specimen plate, a rod connected with the indicating device for actuating the same, a specimen engaging member carried by the rod, means sleeved on the rod for applying a load to the specimen engaging member for compressing a specimen on the plate, an arm mounted on the post for supporting the load applying means independently of the specimen engaging member, and a quick release latch engaging the arm to hold same in engagement with the load applying means.

4. In a testing apparatus of the character described, a support, a post on the support, a specimen plate on the support, an indicating device, means on the post for supporting the indicating device in vertical alignment with the specimen plate, a rod connected with the indicating device for actuating the same, a specimen engaging member carried by the rod, means sleeved on the rod for applying a load to the specimen engaging member for compressing a specimen on the plate, means for supporting the load applying means independently of the specimen engaging member, and means removably securing the load applying means and the specimen engaging member in a unit for common movement in opposite directions axially of the rod.

5. In a testing apparatus of the character described, a support adapted to receive a test specimen, an indicating device, means for supporting the indicating device in vertical alignment with the specimen support, means connected with the indicating device for actuating the same, a specimen engaging member carried by the indicating device actuating means, means for substantially balancing the weight of the specimen engaging member and indicating device actuating means, a load means adapted for engagement with the specimen engaging means, means supporting the load means, and means hinged on the indicating device supporting means for releasing the load supporting means for applying the load to the specimen engaging means for compressing the specimen.

6. In a testing apparatus of the character described, a support, a specimen plate on the support, an indicating device, means on the support for adjustably mounting the indicating device in vertical alignment with the specimen plate, means connected with and depending from the indicating device for actuating same, a specimen engaging member carried by the indicating device actuating means, means for substantially balancing the weight of the specimen engaging member and indicating device actuating means, a load means adapted for engagement with the specimen engaging means, an arm hingedly mounted on the indicating device mounting means adapted for engagement with the load means, a latch releasably engaging the arm to hold same in engagement with the load means for supporting said load means above the specimen, and means for controlling the latch and release of the load means for applying the load to the specimen engaging means for compressing the test specimen.

7. In a testing apparatus of the character described, a support adapted to receive a test specimen, an indicating device, means on the support for adjustably mounting the indicating device, means connected with the indicating device for actuating same, a specimen engaging member carried by the indicating device actuating means, a load means adapted for application to the specimen engaging member, an arm hingedly mounted on the indicating device mounting means adapted for engagement with the load means, a latch releasably engaging the arm to hold same in engagement with the load means for supporting said load means in inoperative position, and means for controlling the latch and release of the load means for applying the load to the specimen engaging member for compressing the test specimen.

WILBUR S. CLAUS.